United States Patent
Kim

(10) Patent No.: US 7,058,742 B2
(45) Date of Patent: Jun. 6, 2006

(54) METHOD AND APPARATUS FOR ARBITRATING COMMON BUS BY USING URGENT CHANNEL

(75) Inventor: Jung-Hyun Kim, Sungnam (KR)

(73) Assignee: Samsung Electronics Co., Ltd. (KR)

( * ) Notice: Subject to any disclaimer, the term of this patent is extended or adjusted under 35 U.S.C. 154(b) by 270 days.

(21) Appl. No.: 10/400,096

(22) Filed: Mar. 26, 2003

(65) Prior Publication Data

US 2004/0010646 A1  Jan. 15, 2004

(30) Foreign Application Priority Data

Jul. 12, 2002   (KR) .............................. 2002-40595

(51) Int. Cl.
*G06F 13/362*  (2006.01)
*G06F 13/368*  (2006.01)

(52) U.S. Cl. ....................... 710/116; 710/119
(58) Field of Classification Search ................ 710/116, 710/119
See application file for complete search history.

(56) References Cited

U.S. PATENT DOCUMENTS

| 5,146,596 | A  | * | 9/1992  | Whittaker et al. ........... 710/116 |
| 5,572,686 | A  | * | 11/1996 | Nunziata et al. ............. 710/116 |
| 6,134,625 | A  | * | 10/2000 | Abramson .................... 710/241 |
| 6,385,680 | B1 | * | 5/2002  | Larson et al. ................ 710/119 |
| 6,425,037 | B1 | * | 7/2002  | Kondo et al. ................. 710/241 |
| 6,505,265 | B1 | * | 1/2003  | Ishikawa et al. ............. 710/113 |
| 6,829,644 | B1 | * | 12/2004 | Aufderheide ................. 709/226 |
| 2001/0042147 | A1 | * | 11/2001 | Adams et al. ................ 710/100 |

* cited by examiner

*Primary Examiner*—Rehana Perveen
*Assistant Examiner*—Jeremy S. Cerullo
(74) *Attorney, Agent, or Firm*—F. Chau & Associates LLC

(57) ABSTRACT

A method and apparatus for arbitrating between a plurality of masters for use of a common bus. Arbitration is preferably performed based on an urgency and a predetermined priority of a master requesting use of the common bus, wherein a lower priority master requesting urgent use of the common bus can be granted authority to use the common bus over a master having a higher priority.

12 Claims, 3 Drawing Sheets

METHOD AND APPARATUS FOR ARBITRATING COMMON BUS BY USING URGENT CHANNEL

TECHNICAL FIELD

The present invention relates to a method and apparatus for arbitrating between a plurality of masters for use of a common bus in a communication system. More specifically, the invention relates to a method and apparatus for arbitrating between a plurality of masters for use of a common bus based on an urgency and a predetermined priority of a master requesting use of the common bus, wherein a lower priority master requesting urgent use of the common bus can be granted authority to use the common bus over a master having a higher priority.

BACKGROUND

In general, in a system in which a plurality of master processors are commonly coupled to one serial bus for communicating between the masters, one master processor at a time is granted authority to transmit data over the bus. By way of example, an integrated system on a single chip, such as a microcontroller, typically comprises several types of functional blocks. To minimize the size of the chip, such system architecture generally comprises a common data bus.

A system, such as a microcontroller, generally has an arbiter for performing an arbitrating operation to control access to the common bus by the integrated functional blocks (or masters). In such systems, to perform arbitration, a bus master that uses a common data bus can be classified with an importance level (or priority level) based on the rate at which the master uses the common bus, wherein a fixed preference arbitrating method is typically used to perform arbitration based on such priorities.

FIG. 1 is a diagram of a conventional system for arbitrating between a plurality of masters for access to common bus. The system includes a common bus 10 and first through nth masters (20-1~20-N) that are connected to the common bus 10. The masters communicate with each other over the common bus 10. Each of the masters (20-1~20-N) individually generate first through nth bus request signals (Request_1~Request_N), respectively, and output the bus request signals to an arbiter 30. The arbiter 30 receives bus request signals (Request_1~Request_N) from the masters (20-1~20-N), and then outputs bus grant signals (Grant_1~Grant_N) to the first through nth masters (20-1~20-N), respectively, according to a designated preferential order (predetermined priority). The master that receives a bus grant signal is authorized to access the common bus 10 and communicates with other masters.

There are various disadvantages to the system architecture of FIG. 1. For instance, data can be lost and the bus use efficiency can decrease when a master having a lower preferential order has difficulty in receiving timely authority to use the bus. These problems are enhanced as the amount of masters using the bus increases.

SUMMARY OF THE INVENTION

The present invention is directed to a method and apparatus for arbitrating between a plurality of masters for use of a common bus. Arbitration is preferably performed based on an urgency and a predetermined priority of a master requesting use of the common bus. Arbitration is preferably performed through use of an urgent channel that enables the masters to transmit urgency requests to an arbiter. A master having urgency can obtain authorization to use the bus by simultaneously transmitting a bus request signal and an urgent requirement signal to the arbiter. As such, a lower priority master requesting urgent use of the common bus can be granted authority to use the common bus over a master having a higher priority.

According to one aspect of the invention, a method of arbitrating between a plurality of masters for use of a common bus comprises the steps of receiving a bus request signal and an urgent requirement signal through an urgent channel from a master having an urgency to use the common bus over at least one other master requesting use of the bus and having a higher priority of use of the bus, and authorizing use of the common bus by sending a bus grant signal to the master having the urgency to use the bus.

The urgent requirement signal can be generated by a master to specify an urgency of that master for using the common bus and there may be several urgent requirement signals generated simultaneously by two or more masters. The urgent requirement signal can specify some extent of the urgency of a master by combining an urgent requirement signal with a bus request signal generated by the master.

In another aspect of the invention, when two or more masters generate an urgent requirement signal together with a bus request signal at the same time, a bus grant signal is sent to the master having the highest preferential order (priority) among the two or more masters, based on a predetermined preferential order (priority) of the masters for using the bus.

In yet another aspect, when two or more masters generate only a bus request signal (no urgent requirement signal) at the same time, a bus grant signal will be sent to the master having the highest preferential order according to the predetermined preferential order.

According to another aspect of the invention, an apparatus comprises a bus and a plurality of masters commonly connected to the bus, wherein each master can generate a bus request signal and an urgent requirement signal to request use of the bus. The apparatus further comprises an arbiter that receives and processes bus request signals and urgent requirement signals that are output from one or more masters requesting use of the bus, and selectively outputs a bus grant signal to one of the masters requesting use of the bus based on one of priority, urgency, and both, to authorize use of the bus.

In another aspect of the invention, the arbiter comprises a plurality of decoders, wherein each of the decoders receives and processes a bus request signal and an urgent requirement signal output from a corresponding one of the plurality of masters, and outputs a corresponding bus request signal and a preferential group selection signal in response thereto, and a plurality of arbiter logic circuits for receiving an uppermost preferential group selection signal output from the plurality of decoders, and generating and outputting bus grant signals. The arbiter further comprises a selection logic circuit for receiving the preferential group selection signals output from the plurality of decoders, and outputting a bus grant selection signal, and a multiplexer for selectively outputting one of the bus grant signals generated by the arbiter logic circuits in response to the bus grant selection signal output from the selection logic circuit.

Preferably, when two or more masters send an urgent requirement signal together with a bus request signal to the arbiter at the same time, the arbiter selectively outputs a bus grant signal for the master having the highest preferential order (priority) among the two or more masters, based on a predetermined preferential order (priority) of the masters for using the bus.

Preferably, when two or more masters send only a bus request signal (no urgent requirement signal) to the arbiter at the same time, the arbiter selectively outputs a bus grant signal for the master having the highest preferential order among the two or more masters according to the predetermined preferential order.

In another aspect of the invention, the arbiter comprises a plurality of decoders, wherein each of the decoders receives and processes a bus request signal and an urgent requirement signal output from a corresponding one of the plurality of masters, and outputs a corresponding bus request signal and a preferential group selection signal in response thereto and a plurality of arbiter logic circuits for receiving an uppermost preferential group selection signal output from the plurality of decoders, and generating and outputting bus grant signals. The arbiter further comprises a selection logic circuit for receiving bus request signals, and outputting a bus grant selection signal, and a multiplexer for selectively outputting one of the bus grant signals generated by the arbiter logic circuits in response to the bus grant selection signal output from the selection logic circuit.

BRIEF DESCRIPTION OF THE DRAWINGS

Preferred embodiments of the invention will become apparent from the following description in conjunction with the accompanying drawings, in which.

DETAILED DESCRIPTION OF PREFERRED EMBODIMENTS

Hereinafter, preferred embodiments of the present invention will be described in detail with reference to the accompanying drawings. For purposes of clarity, a detailed description of known functions and systems has been omitted.

Figure 1:
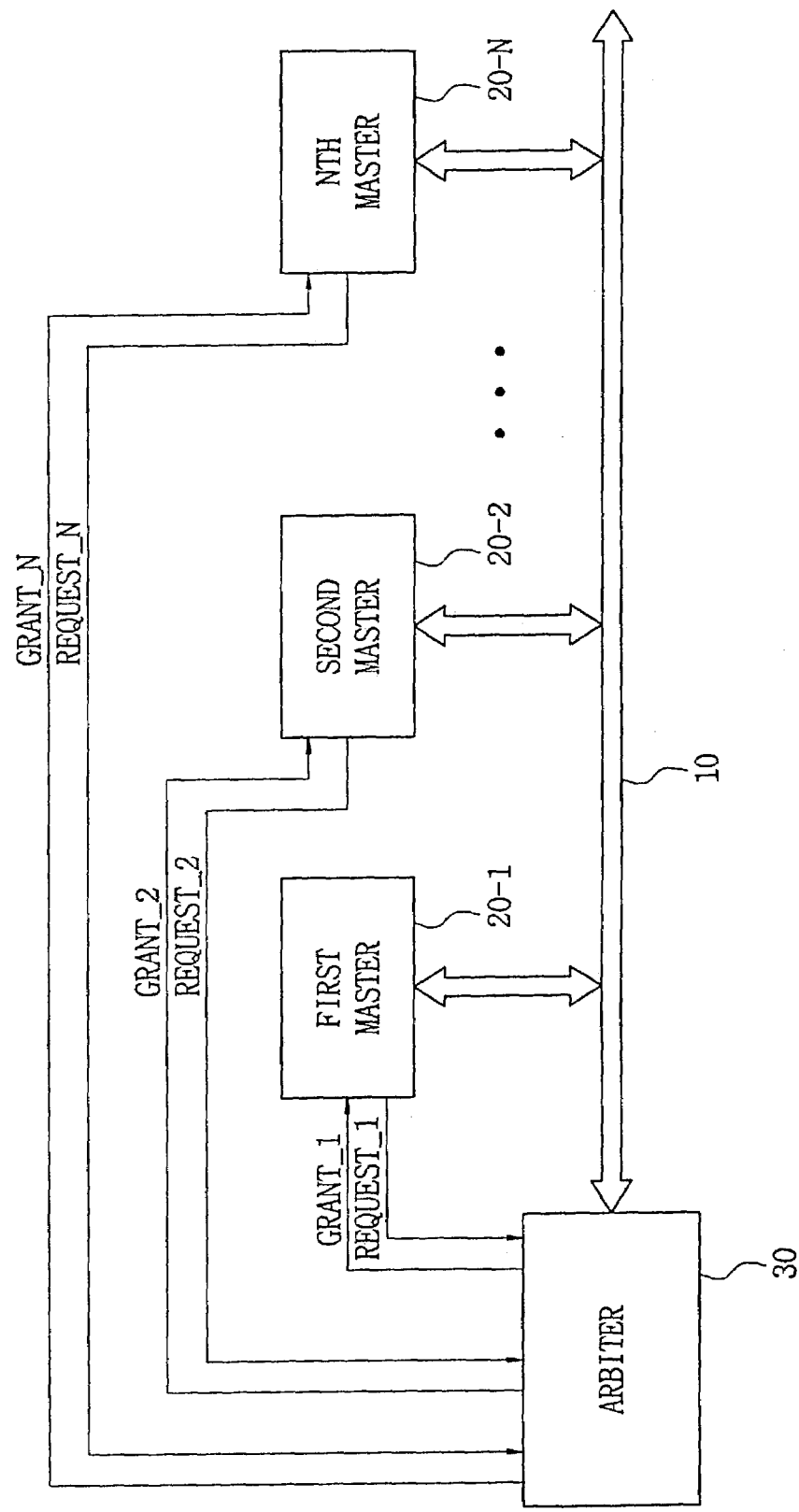
FIG. 1 is a diagram of a conventional system for arbitrating between a plurality of masters for use of a common bus.
Figure 2:
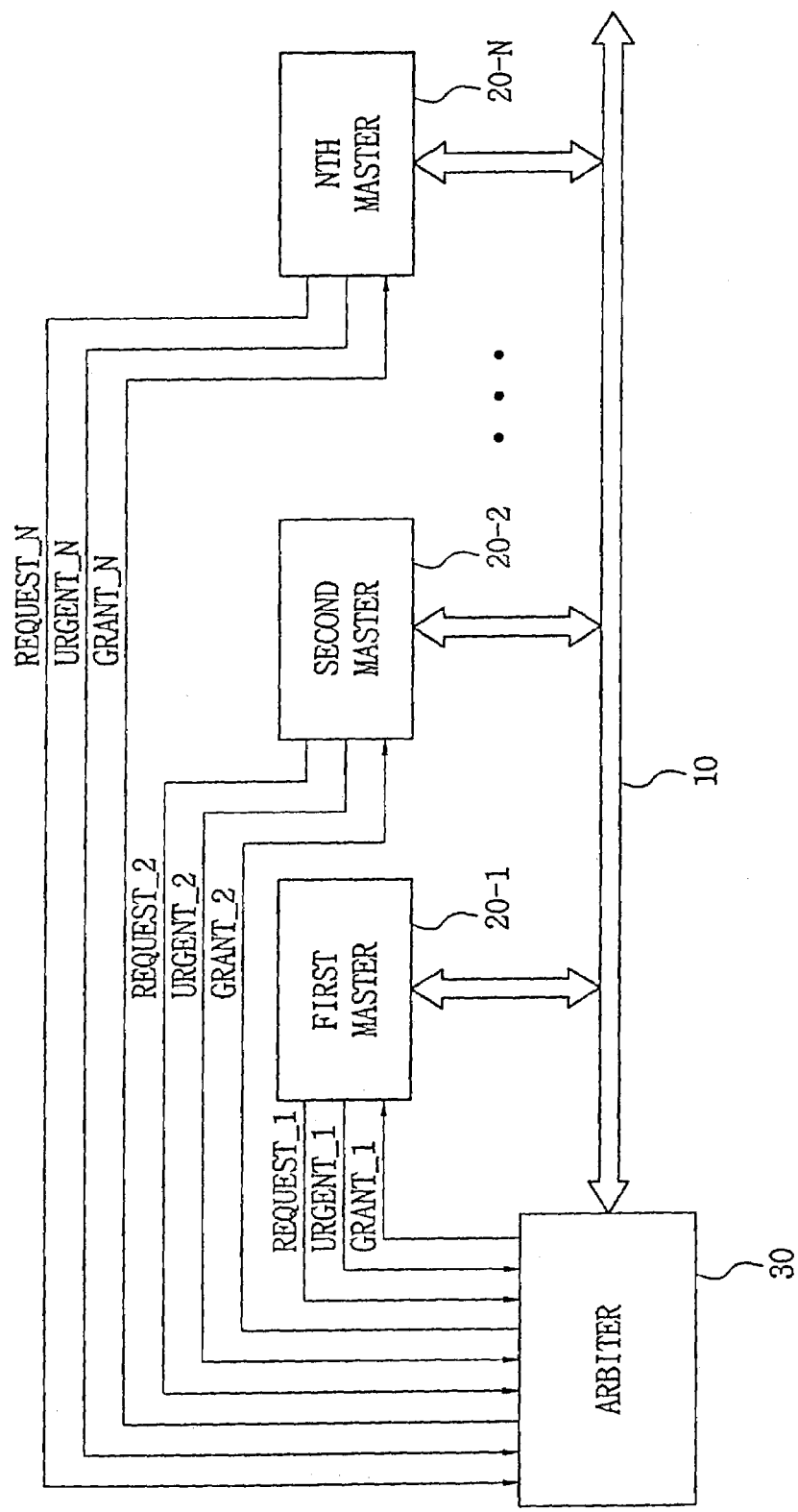
FIG. 2 is a diagram illustrating a system for arbitrating between a plurality of masters for use of a common bus according to an embodiment of the present invention.

FIG. 2 is a diagram illustrating a system for arbitrating between a plurality of masters for use of a common bus according to an embodiment of the present invention. The system comprises a common bus 10 and first through nth masters (20-1~20-N) that are coupled to the common bus 10. The masters (20-1~20-N) generate first through nth bus request signals (Request_1~Request_N) and first through nth urgent requirement signals (URGENT_1~URGENT_N), respectively. An arbiter 30 receives the bus request signals (Request_1~Request_N) and the urgent requirement signals (URGENT_1~URGENT_N) from the masters (20-1~20-N), and selectively outputs the bus grant signals (Grant_1~Grant_N) to the masters (20-1~20-N)) based on designated preferential order (priority) and an urgency. The urgent requirement signals (URGENT_1~URGENT_N) are preferably transmitted through a separate urgent channel.

Figure 3:
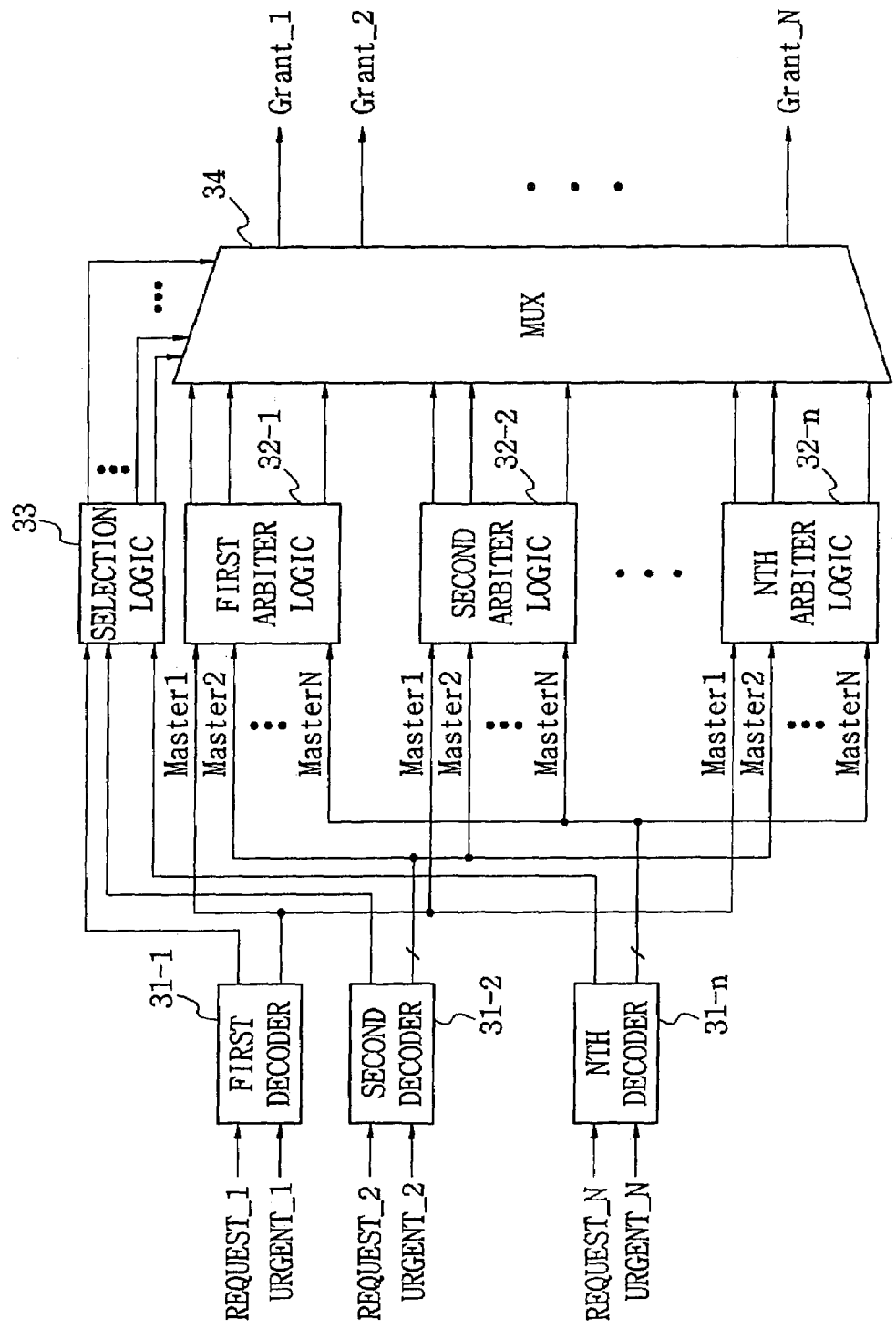
FIG. 3 is a schematic diagram of an arbiter according to an embodiment of the invention.

FIG. 3 is a schematic diagram of an arbiter according to an embodiment of the present invention, which may be implemented in the system of FIG. 2. The arbiter 30 comprises first through nth decoders (31-1~31-n) for receiving the first through nth bus request signals (Request_1~Request_N) and the first through nth urgent requirement signals (URGENT_1~URGENT_N) from the first through nth masters (20-1~20-N), respectively. Each of decoders (31-1~31-n) outputs a corresponding bus request signal and a preferential group selection signal. First through nth arbiter logic circuits (32-1~32-n) receive an uppermost preferential group selection signal output from the decoders (31-1~31-n), and generate and output bus grant signals (Grant_1~Grant_N). A selection logic circuit 33 receives the preferential group selection signals output from the decoders (31-1~31-n), and outputs bus grant selection signals to a multiplexer 34. The multiplexer 34 selectively outputs one of the bus grant signals (Grant_1~Grant_N) generated by an arbiter logic circuit (32-1~32-n) in response to the bus grant selection signal output from the selection logic circuit 33.

A detailed description of a method operation of the systems shown in FIGS. 2 and 3 will now be provided.

In FIGS. 2 and 3, the first through nth masters (20-1~20-N) generate the first through nth bus request signals (Request_1~Request_N) and the first through nth urgent requirement signals (URGENT_1~URGENT_N), respectively, and separately output the signals (Request_1~Request_N) and (URGENT_1~URGENT_N) to the arbiter 30. The arbiter 30 processes the first through nth bus request signals (Request_1~Request_N) and the first through nth urgent requirement signals (URGENT_1~URGENT_N), and then selectively outputs the bus grant signal (Grant_1~Grant_N) to one of the first through nth masters (20-1~20-N) according to a designated priority and an urgency. The master that receives the bus grant signal among the first through nth masters (20-1~20-N) is authorized to access the common bus 10 to thereby communicate with other masters, for example.

A method for generating the bus grant signals (Grant_1~Grant_N) will now be described in further detail with reference to FIG. 3. As explained above, the bus grant signals (Grant_1~Grant_N) are transmitted to the first through nth masters (20-1~20-N) according to a predetermined priority and urgency, when the arbiter 30 receives the first through nth bus request signals (Request_1~Request_N) and the first through nth urgent requirement signals (URGENT_1~URGENT_N).

Preferably, a preferential order is pre-designated to the masters (20-1~20-N) for authorizing use of the common bus 10. Each of the first through nth decoders (31-1~31-n) combines the bus request signals (Request_1~Request_N) and the first through nth urgent requirement signals (URGENT_1~ URGENT_N) received from the masters (20-1~20-N), and outputs a corresponding bus request signal and preferential group selection signal. In one embodiment, the preferential group is preferably divided into an uppermost preferential group, a medium preferential group and a lowermost preferential group.

The first through nth arbiter logic circuits (32-1~32-n) receive the uppermost preferential group selection signal outputted from the first through nth decoders (31-1~31-n), and generate and output the bus grant signals (Grant_1~Grant_N). A selection logic circuit 33 receives the preferential group selection signal output from the first through nth decoders (31-1~31-n), and outputs the bus grant selection signal to a multiplexer 34. The multiplexer 34 selectively outputs the bus grant signals (Grant_1 Grant_N) generated by the first through nth arbiter logic circuits (32-1~32-n) in response to the bus grant selection signal output from the selection logic circuit 33.

For example, assume the first master 20-1 is designated as the highest preferential order. Assume further that the first master 20-1 generates the first bus request signal Request_1 and sends it to the first decoder 31-1. The first decoder 31-1 preferably outputs a logic "high" control signal to a line Master1, and the second through nth decoders (31-2~31-n) output a logic "low" control signal to the remaining lines (Master2~MasterN). The first arbiter logic circuit 32-1 thus outputs the first through nth bus grant signals (Grant_1~Grant_N) to the multiplexer 34. At this time, the selection logic circuit 33 receives a logic "high" control signal output from the first decoder 31-1, and outputs a signal for selecting the first bus grant signal Grant_1. Thus, the multiplexer 34 selects and outputs the first bus grant signal Grant_1 output from the first arbiter logic circuit 32-1. The first bus grant signal Grant_1 is received by the first master 20-1, which is then authorized to use the common bus 10.

Each of the first through nth masters (20-1~20-N) occupies the common bus according to such designated preferential order. Under an occupancy state based on the preferential order, assuming that the second master 20-2 is-designated as the lowermost preferential order among the masters having a lower preferential order, it is difficult for the second master 20-2 to obtain access to the common bus 10 because its preferential order is the lowermost order. In accordance with one aspect of the invention, when the second master 20-2 needs to use the bus 10, the second master 20-2 can generate the second bus request signal Request2 and the second urgent requirement signal URGENT2, and send such signals to the second decoder 31-2. Then, the second decoder 31-2 outputs a logic "high" control signal to the line Master2, and the first decoder 31-1 and the third through nth decoders (31-3~31-n) output a logic "low" control signal to the remaining lines (Master1, Master3~MasterN). The first arbiter logic circuit 32-1 therefore outputs the first through nth bus grant signals (Grant_1~Grant_N). At this time, the selection logic circuit 33 receives the high signal outputted from the second decoder 31-2, and outputs a signal for selecting the second bus grant signal Grant2. Thus, the multiplexer 34 selectively outputs the second bus grant signal Grant2 output from the first arbiter logic circuit 32-1, and sends it to the second master 20-2. In doing so, the second master 20-2 is granted access to the common bus 10 and communicates thereby.

In another aspect of the invention, when bus request signals are generated at the same time from two or more masters among the first through nth masters (20-1~20-N), a bus grant signal Grant is outputted to its corresponding master according to a pre-designated preferential order. In another aspect of the invention, when one of the masters generates a bus request signal Request and an urgent requirement signal URGENT simultaneously, the arbiter will output a bus grant signal Grant to the master to authorize access to the common bus 10. In another aspect of the invention, when a bus request signal Request and an urgent requirement signal URGENT are simultaneously sent from two or more masters, a bus grant signal Grant is sent to the master having the uppermost preferential order by the predetermined preferential order to grant access to the common bus 10.

Preferably, the highest preferential order in the respective masters should not exceed some predetermined constant rate so as to evenly grant use of the bus to all masters. The preferential order is effectively designated on the basis of a characteristic of the masters by increasing a rank of a master having a high bus use rate and by lowering the rank of a master having a low bus use rate.

According to one embodiment of the present invention, the selection logic circuit 33 is configured to receive outputs of the first through nth decoders (31-1~31-n) and selectively output one of the bus grant signals (Grant_1~Grant_N). In another embodiment, the selection logic circuit 33 can be configured to receive the bus request signal (Request_1~Request_N) and then selectively output the bus grant signal (Grant_1~Grant_N) without deviating from a scope of the present invention.

The urgent requirement signal URGENT indicates an urgency concerning the bus use, and can be provided with several signals instead of one urgent requirement signal. The urgency may be also represented by combining the urgent requirement signal URGENT and the bus request signal Request.

As mentioned above, in accordance with the present invention, among numerous masters whose preferential order is predetermined, when a master having a low preferential order requires an urgent preferential order, the master can send a bus request signal and an urgent requirement signal together to use a common bus. Thus, the invention provides an advantage of preventing data from being lost and enables efficient use of the common bus.

It will be apparent to those skilled in the art that various modifications and variations can be made in preferred embodiments of the present invention without deviating from the spirit or scope of the invention. Thus, it is intended that the present invention cover the modifications and variations of the embodiments, as defined by the appended claims.

What is claimed is:

1. A method of arbitrating between a plurality of masters for use of a common bus, the method comprising the steps of:

receiving a bus request signal and an urgent requirement signal through an urgent channel from a master having an urgency to use said common bus over at least one other master requesting use of said bus and having a higher priority of use of said bus; and authorizing use of said common bus by sending a bus grant signal to said master having the urgency to use said bus, wherein each of the masters is assigned a predetermined preferential order for using said common bus, wherein said preferential order is ranked from a highest priority to a lowest priority.

2. The method of claim 1, further comprising the steps of:

receiving a bus request signal and an urgent requirement from each of two or more masters; and sending a bus grant signal to a master having a highest preferential order among said two or more masters.

3. The method of claim 1, further comprising the steps of:

receiving a bus request signal from each of two or more masters; and sending a bus grant signal to a master having a highest preferential order among said two or more masters.

4. An apparatus, comprising:

a bus;

a plurality of masters commonly connected to said bus, wherein each master can generate a bus request signal and an urgent requirement signal to request use of said bus; and an arbiter that receives and processes bus request signals and urgent requirement signals that are output from one or more masters requesting use of said bus, and selectively outputs a bus grant signal to one of said masters requesting use of said bus based on a predetermined priority among the masters, an urgency of one or more masters, and both, to authorize use of said bus.

5. The apparatus of claim 4, wherein said arbiter comprises:
   a plurality of decoders, wherein each of said decoders receives and processes a bus request signal and an urgent requirement signal output from a corresponding one of the plurality of masters, and wherein the decoders output corresponding bus request signals and preferential group selection signals in response thereto, the preferential group selection signals comprising at least an uppermost preferential group selection signal;
   a plurality of arbiter logic circuits for receiving the uppermost preferential group selection signal output from said plurality of decoders, and generating and outputting bus grant signals;
   a selection logic circuit for receiving said preferential group selection signals output from said plurality of decoders, and outputting a bus grant selection signal; and
   a multiplexer for selectively outputting one of said bus grant signals generated by said arbiter logic circuits in response to said bus grant selection signal output from said selection logic circuit.

6. The apparatus of claim 5, wherein each of said masters is assigned a preferential order for using said bus, wherein the preferential orders are ranked from a highest priority to a lowest priority.

7. The apparatus of claim 6, wherein when said arbiter receives a bus request signal and an urgent requirement signal from each of two or more masters, said arbiter outputs a bus grant signal for a master having a higher preferential order among said two or more masters.

8. The apparatus of claim 6, wherein when said arbiter receives a bus grant signal from each of two or more masters, said arbiter outputs a bus grant signal for a master having a higher preferential order among said two or more masters.

9. The apparatus of claim 4, wherein said arbiter comprises:
   a plurality of decoders, wherein each of said decoders receives and processes a bus request signal and an urgent requirement signal output from a corresponding one of the plurality of masters, and wherein the decoders output corresponding bus request signals and preferential group selection signals in response thereto, the preferential group selection signals comprising at least an uppermost preferential group selection signal;
   a plurality of arbiter logic circuits for receiving the uppermost preferential group selection signal output from said plurality of decoders, and generating and outputting bus grant signals;
   a selection logic circuit for receiving bus request signals, and outputting a bus grant selection signal; and
   a multiplexer for selectively outputting one of said bus grant signals generated by said arbiter logic circuits in response to said bus grant selection signal output from said selection logic circuit.

10. The apparatus of claim 4, wherein the one or more masters is a microcontroller.

11. The apparatus of claim 4, wherein the urgent requirement signals generated by the masters are sent to the arbiter on separate channels.

12. A method of arbitrating use of a common bus by a plurality of masters, the method comprising the steps of:
   designating a predetermined order of priority of use of the common bus by the masters;
   authorizing use of the common bus by a master having a highest priority of use among two or more masters, when each of said two or more masters outputs a bus request signal for requesting use of the bus;
   authorizing use of the common bus by a master having an urgency and a highest priority of use of the common among two or more masters, when each of said two or more masters outputs a bus request signal and an urgency requirement signal for requesting use of the bus; and
   authorizing use of the common bus by a master requesting urgent use of the common bus among two or more masters irrespective of the priority of use of each of said two or more masters, when only said master requesting urgent use among said two or more masters outputs an urgency requirement signal.

* * * * *